US012458553B2

(12) United States Patent
Graves et al.

(10) Patent No.: US 12,458,553 B2
(45) Date of Patent: Nov. 4, 2025

(54) PATIENT SUPPORT APPARATUS WITH PUMP

(71) Applicant: Stryker Corporation, Kalamazoo, MI (US)

(72) Inventors: Michael W. Graves, Paw Paw, MI (US); Christopher Ryan Sweeney, Portage, MI (US); Nicholas D. Koch, Battle Creek, MI (US); Matthew A. Cutler, Portage, MI (US)

(73) Assignee: Stryker Corporation, Portage, MI (US)

( * ) Notice: Subject to any disclaimer, the term of this patent is extended or adjusted under 35 U.S.C. 154(b) by 89 days.

(21) Appl. No.: 18/581,013

(22) Filed: Feb. 19, 2024

(65) Prior Publication Data

US 2024/0277544 A1 Aug. 22, 2024

Related U.S. Application Data

(60) Provisional application No. 63/446,595, filed on Feb. 17, 2023.

(51) Int. Cl.
*A61G 7/057* (2006.01)
*A61G 7/018* (2006.01)
*A61G 7/05* (2006.01)

(52) U.S. Cl.
CPC ......... *A61G 7/05769* (2013.01); *A61G 7/018* (2013.01); *A61G 7/0506* (2013.01); *A61G 7/0524* (2016.11)

(58) Field of Classification Search
CPC .......... A61G 7/00; A61G 7/002; A61G 7/018; A61G 7/05; A61G 7/0506; A61G 7/0524; A61G 7/0525; A61G 7/0526; A61G 7/057; A61G 7/05707; A47C 27/08; A47C 27/081; A47C 27/082; A47C 27/083; A47C 27/084; A47C 27/085
See application file for complete search history.

(56) References Cited

U.S. PATENT DOCUMENTS 4,584,989 A * 4/1986 Stith .................... A61G 7/0528 177/144
5,005,240 A * 4/1991 Vrzalik ................ A61G 7/0509 5/713
5,325,551 A 7/1994 Tappel et al.
5,542,136 A * 8/1996 Tappel ............... A61G 7/05776 5/713
5,542,138 A 8/1996 Williams et al.
5,611,096 A * 3/1997 Bartlett .................. A61G 7/001 5/713
7,406,736 B2 8/2008 Flick
7,638,720 B1 * 12/2009 Schimke ................ A61G 7/018 200/83 Z
8,296,887 B2 10/2012 Doehler et al.
8,413,271 B2 * 4/2013 Blanchard ............. A61G 7/001 5/173
8,756,726 B2 6/2014 Hamberg et al.
8,910,334 B2 12/2014 Lafleche et al.
8,911,387 B2 12/2014 Lafleche et al.
(Continued)

*Primary Examiner* — George Sun
(74) *Attorney, Agent, or Firm* — Warner Norcross + Judd LLP

(57) ABSTRACT

A patient support apparatus including a removable pump assembly that substantially fits within an existing footprint of the patient support apparatus and does not substantially expand the footprint of the patient support apparatus.

20 Claims, 7 Drawing Sheets

(56) References Cited

U.S. PATENT DOCUMENTS

| | | | | |
|---|---|---|---|---|
| 9,089,462 | B1 * | 7/2015 | Lafleche | A61G 7/05715 |
| 9,326,904 | B2 * | 5/2016 | Nomura | A61G 7/05776 |
| 9,468,307 | B2 | 10/2016 | Lafleche et al. | |
| 9,820,904 | B2 | 11/2017 | Lafleche et al. | |
| 11,389,354 | B2 | 7/2022 | Nahavandi et al. | |
| 11,406,547 | B2 * | 8/2022 | Aristide | A61G 7/0503 |
| 2006/0026762 | A1 * | 2/2006 | Hornbach | A61G 7/012<br>5/618 |
| 2006/0038098 | A1 * | 2/2006 | Metz | A61M 5/1415<br>248/229.1 |
| 2007/0174965 | A1 * | 8/2007 | Lemire | A61G 7/0528<br>5/630 |
| 2008/0040860 | A1 | 2/2008 | Price et al. | |
| 2008/0098532 | A1 * | 5/2008 | Gowda | A61G 7/05769<br>5/713 |
| 2011/0061164 | A1 * | 3/2011 | Genaro | A61G 7/05769<br>5/424 |
| 2017/0049645 | A1 * | 2/2017 | Williams | A61G 7/05 |
| 2017/0051851 | A1 * | 2/2017 | Kennedy | F16L 11/118 |
| 2017/0330430 | A1 * | 11/2017 | Goodfield | A61G 7/05 |
| 2019/0290517 | A1 * | 9/2019 | Ross | A61G 7/0508 |
| 2020/0129352 | A1 * | 4/2020 | Paul | A61G 7/05776 |

* cited by examiner

PATIENT SUPPORT APPARATUS WITH PUMP

TECHNICAL FIELD

The present disclosure relates to a patient support apparatus, and more particularly to a patient support apparatus including a pump operable to supply air.

BACKGROUND

The present disclosure relates to patient support apparatuses, such as beds, cots, stretchers, recliners, or the like. More specifically, the present disclosure relates to patient support apparatuses that include a pump operable to provide air. One example used for air from a pump includes inflating a mattress or pad provided on the patient support apparatus. Another example includes supplying air for a low air loss layer through which air may be directed.

SUMMARY

In general, one innovative aspect of the subject matter described herein can be embodied in a patient support apparatus including an overall length and width that define a footprint of the patient support apparatus. The patient support apparatus may include a frame including a deck surface that supports a mattress, a barrier mounted to the frame, and a pneumatic system. The patient support apparatus may include a fluid receiving element or portion in fluid communication with the pneumatic system.

The pneumatic system may include a pump operable to supply fluid to the fluid receiving element via a tube. The pump may be disposed in a raised position relative to the deck surface such that the pump is spaced away from the deck surface of the frame and the mattress. The pump may be disposed substantially inside the footprint of the patient support apparatus.

The foregoing and other embodiments can each optionally include one or more of the following features, alone or in combination. In particular, one embodiment includes all the following features in combination.

In some aspects, the patient support apparatus may include a pump assembly with the pump and pump housing that supports the pump. The pump assembly may include a user interface for facilitating control over operation of the pump.

In some aspects, the patient support apparatus may include a pump assembly with the pump and a pump housing that supports the pump, and where the pump housing is substantially within the footprint of the patient support apparatus.

In some aspects, the patient support apparatus may include a receiver operable to receive and maintain a pump support in a substantially vertical position. The pump support may include first and second ends, and the receiver may be operable to receive a first end of the pump support. The pump may be supported by the pump support proximal to the second end thereof.

In some aspects, the pump support is a pole.

In some aspects, the barrier includes the receiver.

In some aspects, the frame includes the receiver.

In some aspects, the patient support apparatus may include a pump housing for the pump, wherein the pump housing is coupled to the pump support.

In some aspects, the pump assembly may be removably coupled to the pump support.

In some aspects, the patient support apparatus may include a side rail mounted relative to the frame. The side rail may define at least a portion of the footprint of the patient support apparatus. The pump may be disposed inside the footprint of the patient support apparatus as defined at least by the side rail.

In some aspects, the pump may be coupled to the footboard.

In some aspects, the pump may be removably disposed on a patient facing surface of the footboard.

In some aspects, the fluid receiving element may include a bladder, and the pump assembly may be configured to inflate and deflate the bladder.

In general, one innovative aspect of the subject matter described herein can be embodied in a pump assembly for a patient support apparatus. The patient support apparatus may include an overall length and width that define a footprint of the patient support apparatus. The patient support apparatus may include a frame with a deck surface that supports a mattress, and the patient support apparatus may include a barrier mounted to the frame. The pump assembly may include a pump operable to supply fluid to a fluid receiving element via a tube, and a pump housing configured to support the pump. The pump housing may be disposable in a raised position relative to the deck surface such that the pump is spaced away from the deck surface of the frame and the mattress, where the pump housing may be disposable substantially inside the footprint of the patient support apparatus.

The foregoing and other embodiments can each optionally include one or more of the following features, alone or in combination. In particular, one embodiment includes all the following features in combination.

In some aspects, the pump assembly may include a user interface for facilitating control over operation of the pump.

In some aspects, the pump assembly may be configured to attach to and be supported by a pump support, wherein the pump support includes first and second ends.

In some aspects, a receiver of the patient support apparatus is operable to receive a first end of the pump support, and where the pump is supported by the pump support proximal to the second end thereof.

In some aspects, the pump support may be a pole.

In some aspects, the barrier may include the receiver.

In some aspects, the frame may include the receiver.

In some aspects, the fluid receiving element may include a bladder, and the pump assembly may be configured to inflate and deflate the bladder.

Before the embodiments and aspects of the disclosure are explained in detail, it is to be understood that the disclosure is not limited to the details of operation or to the details of construction and the arrangement of the components set forth in the following description or illustrated in the drawings. The disclosure may be implemented in various other embodiments and aspects and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments and aspects. Unless otherwise expressly stated, the use of enumeration should not be construed as limiting one or more embodiments or aspects to any specific order or number of components. Nor should the use of enumeration be construed as excluding from the scope of an embodiment or aspect any additional steps or components that might be combined with or into the enumerated steps or components.

DETAILED DESCRIPTION

Figure 1:
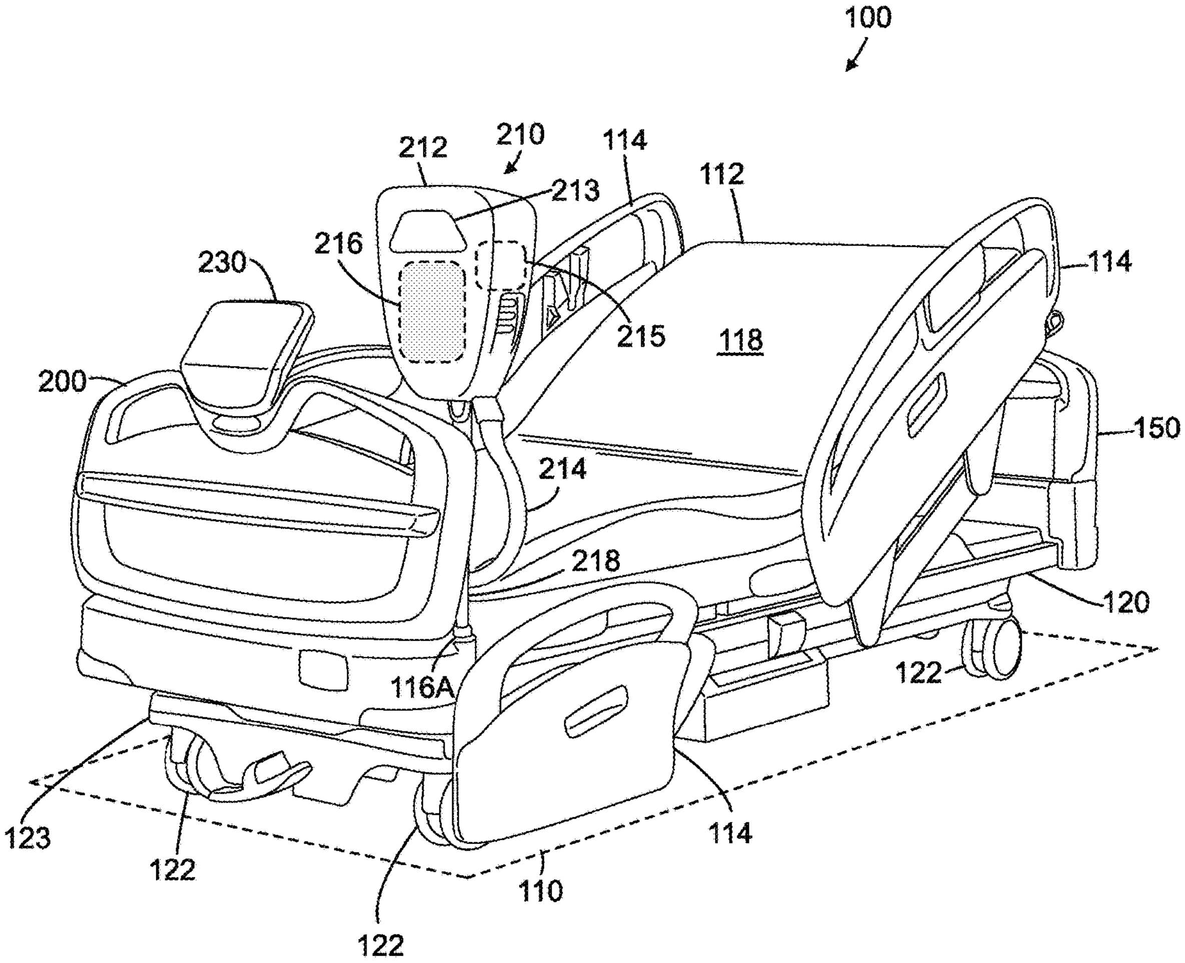
FIG. 1 shows perspective view of a patient support apparatus.

A patient support apparatus in accordance with one embodiment is depicted in FIGS. 1-4 and generally designated 100. The patient support apparatus 100 includes a frame 120 and a patient support 112 for supporting a patient (not shown). The patient support 112, such as a mattress, may be disposed on a deck surface 132 of a deck 130 for comfortably supporting the patient. It is to be understood that the patient support apparatus 100 may be implemented without a mattress or with numerous alternatives for the mattress, such as cushions. The mattress may be an air mattress according to one or more aspects described herein.

In one aspect, as described herein, the patient support apparatus 100 may include a pump assembly 212 that is removable and that substantially fits within an existing footprint of the patient support apparatus 100. The pump assembly 212 may not substantially expand the footprint 110 of the patient support apparatus 100.

Although the particular form of patient support apparatus 100 illustrated in FIGS. 1-4 is a bed adapted for use in a hospital or other medical setting, it is to be understood that patient support apparatus 100 may be a cot, a stretcher, a gurney, a recliner, an operating room table, or a residential bed or any other structure capable of supporting a patient, whether stationary or mobile and/or whether used in a medical or residential setting.

In one aspect, the patient support apparatus 100 may include a plurality of wheels 122 supporting the frame 120. The wheels 122 may allow the patient support apparatus 100 to be easily moved along a surface (i.e., the floor). Alternatively, the patient support apparatus 100 may be implemented without wheels 122, such that the patient support apparatus 100 is relatively stationary. When implemented with wheels 122, the patient support apparatus 100 may include a brake for immobilizing at least one of the wheels, including configurations where the brake immobilizes all of the wheels 122.

The patient support 112 of the patient support apparatus 100 may provide a patient support surface 118 and may be supported on the deck surface 132 of the deck 130, which in turn is supported on the frame 120.

The term "patient support" is used broadly herein and may refer to the whole mattress or cushion that supports a patient thereon or may refer to a portion of the mattress or cushion, such as a topper or an overlay, or to a separate device that can be used with a mattress or cushion, for example such as a pad to be placed on top of a mattress to provide treatment to a patient, such as low air loss, to move a patient, or to change the characteristic of the mattress or cushion, such as described below.

The deck 130 may have one or more articulatable deck sections, including a back deck section ("Fowler"), a seat deck section, and a thigh deck section, which together with the frame 120 are supported on a wheeled base 123 by a lift assembly.

In one aspect, the patient support apparatus 100 may include one or more barriers, such as a footboard 200, a headboard 150, and a plurality of side rails 114. One of the side rails 114 proximal to the footboard 200 in FIG. 1 is shown in a lowered position in which ingress into, and egress out of, the patient support apparatus 100 is not obstructed by the lowered side rail 114. Each side rail 114 may be configured so it can be individually moved between a lowered position and a raised position. The side rails 114 may be moved to one or more intermediate positions as well.

It is to be understood that the patient support apparatus 100 may be modified from what is shown to include one or more components adapted to allow the user to extend the width of deck 130, thereby allowing the patient support apparatus 100 to accommodate patients of varying sizes. For example, the width of the deck 130 may be adjusted, between a first width, a second or intermediate width, and a third or expanded width. The first width may be, for example, a 36 inch width, the second Intermediate width may be, for example a 42 inch width, and the third expanded width may be, for example, a 48 inch width, although these widths may be varied.

Figure 2:
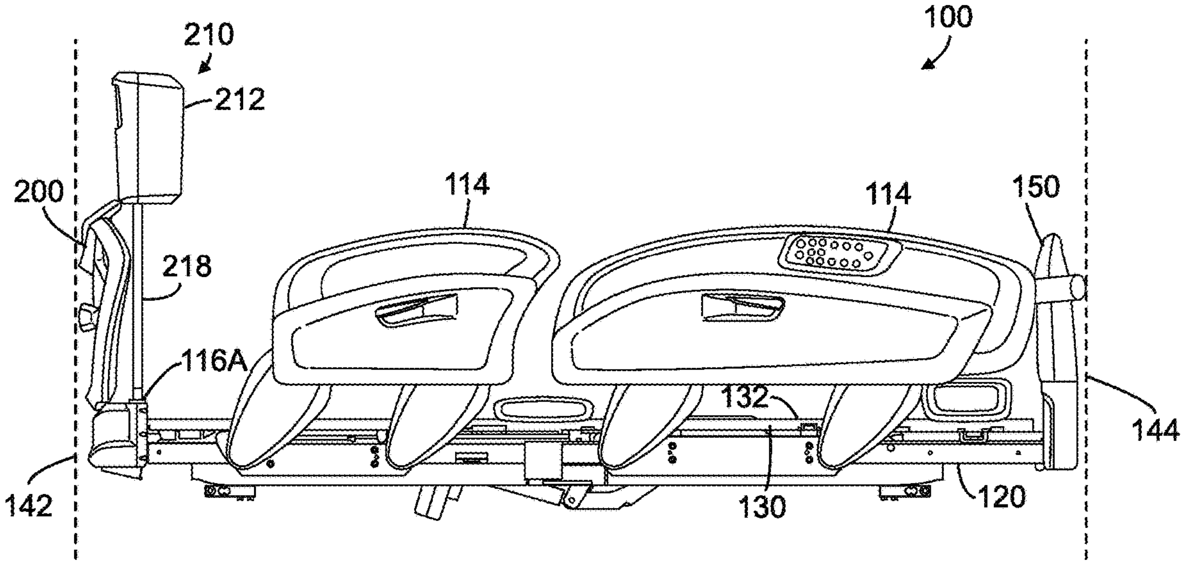
FIG. 2 shows a side, partial view of a patient support apparatus.
Figure 3:
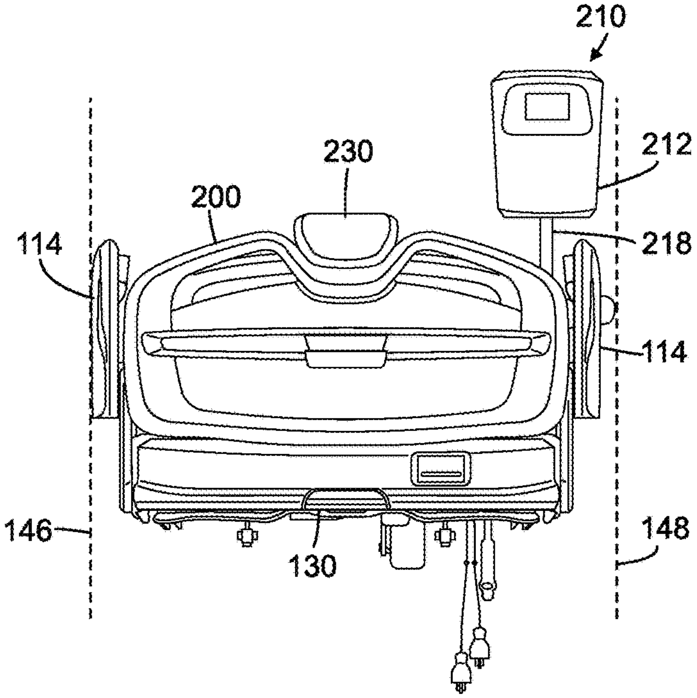
FIG. 3 shows a front, partial view of a patient support apparatus.
Figure 4:
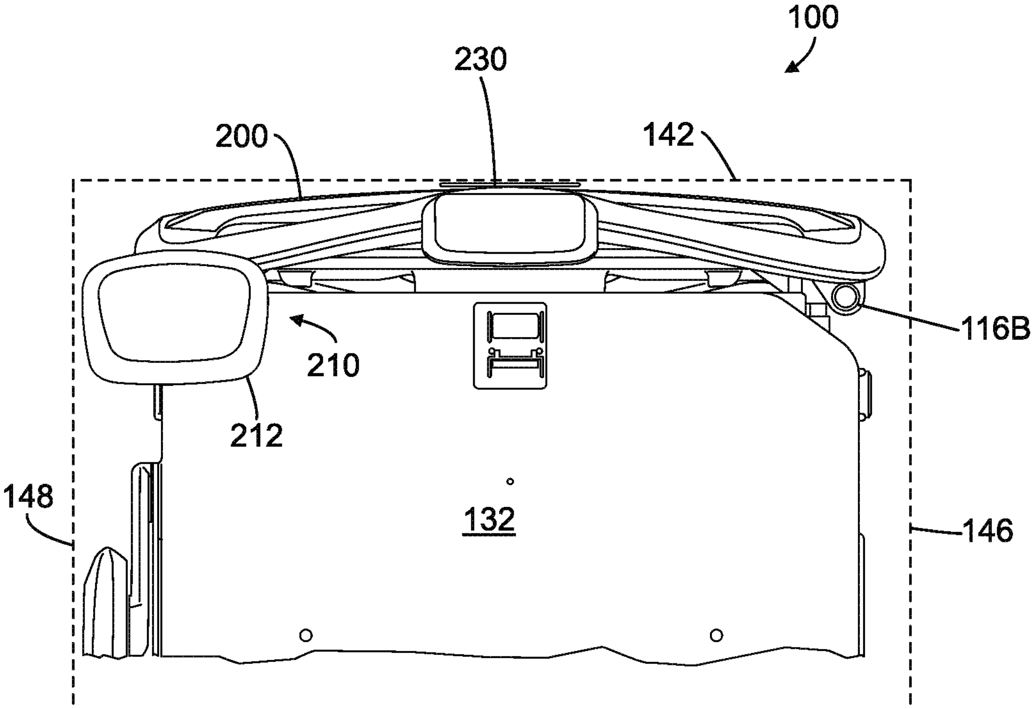
FIG. 4 shows a top, partial view of a patient support apparatus.
Figure 5:
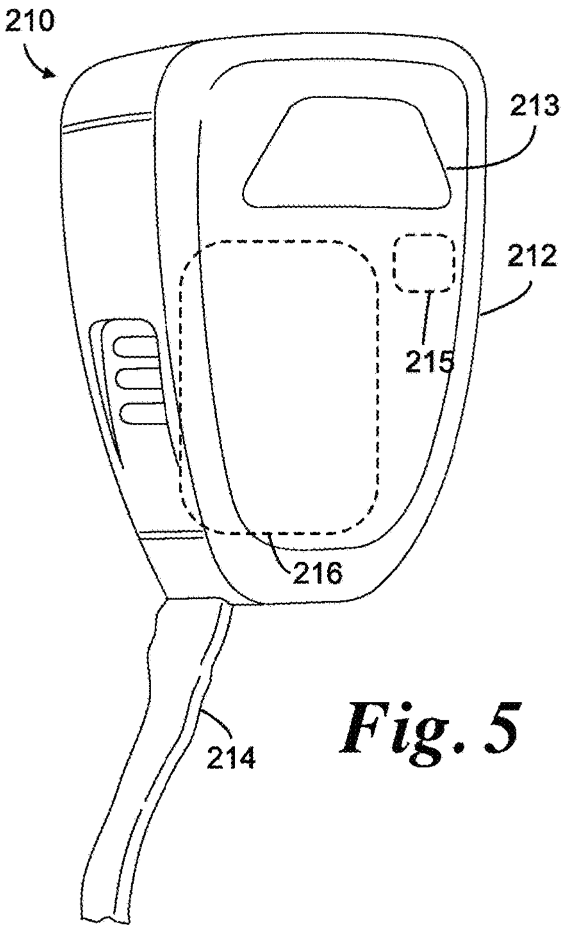
FIG. 5 shows a perspective view of a pneumatic system.
Figure 6:
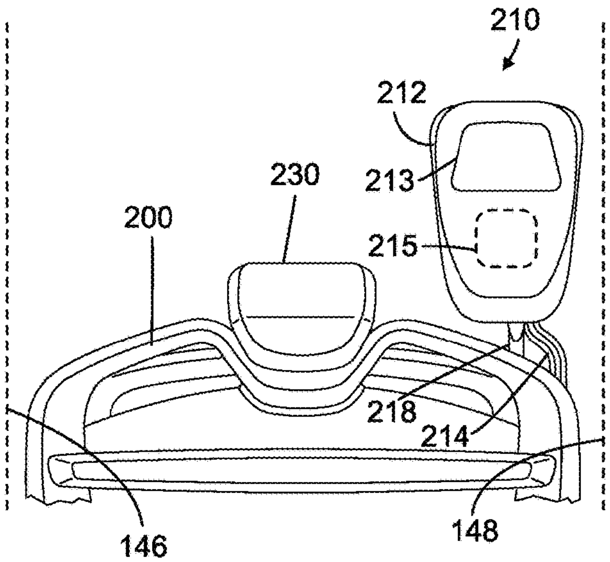
FIG. 6 shows an alternative view of the pneumatic system of FIG. 5 along with a partial view of a footboard of a patient support apparatus.
Figure 7:
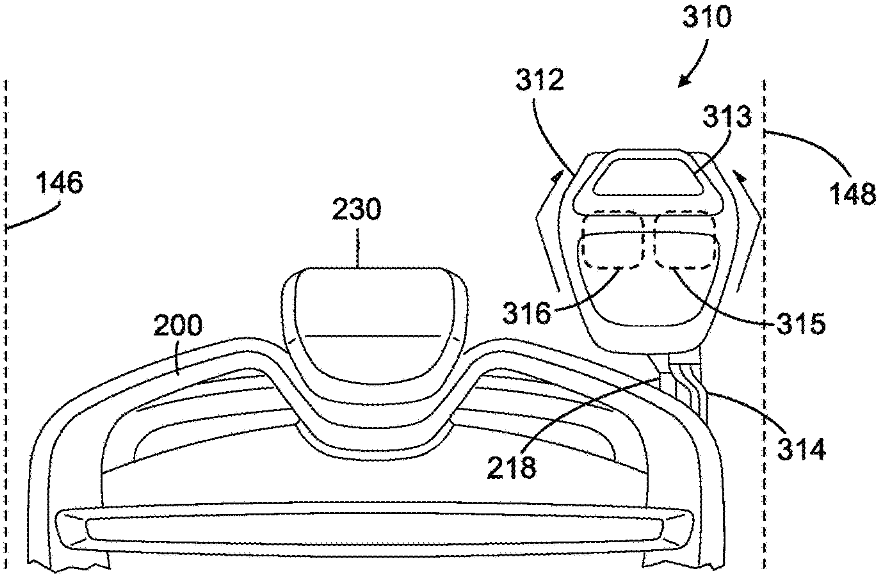
FIG. 7 shows a pneumatic system along with a partial view of a footboard of a patient support apparatus.
Figure 8:
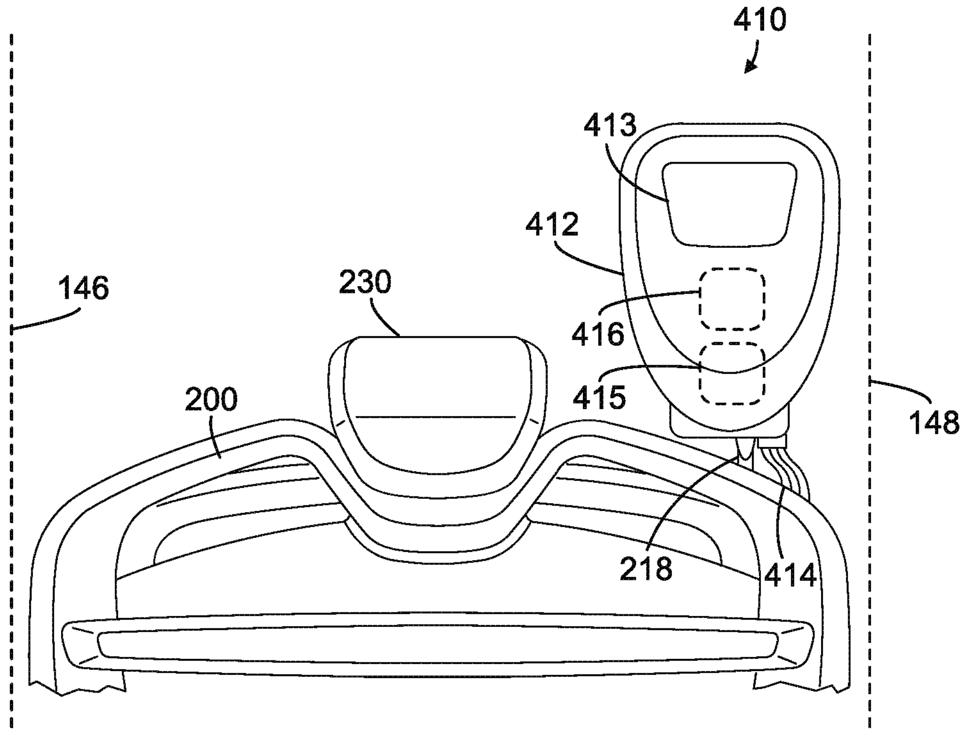
FIG. 8 shows a pneumatic system along with a partial view of a footboard of a patient support apparatus.
Figure 9:
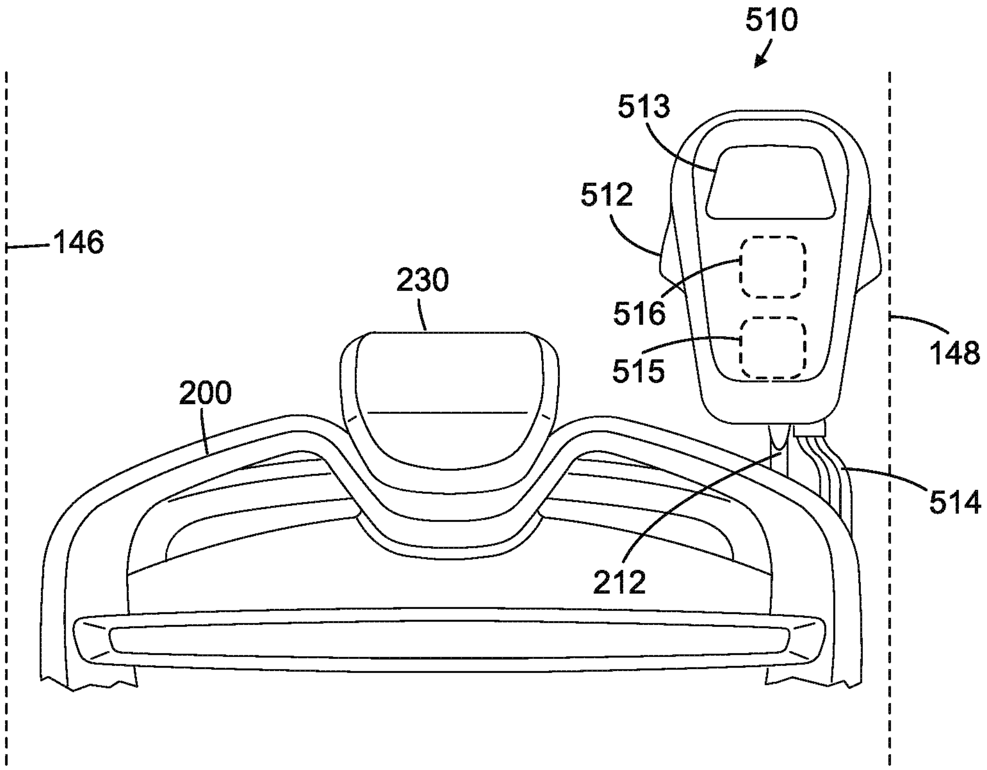
FIG. 9 shows a pneumatic system along with a partial view of a footboard of a patient support apparatus.
Figure 10:
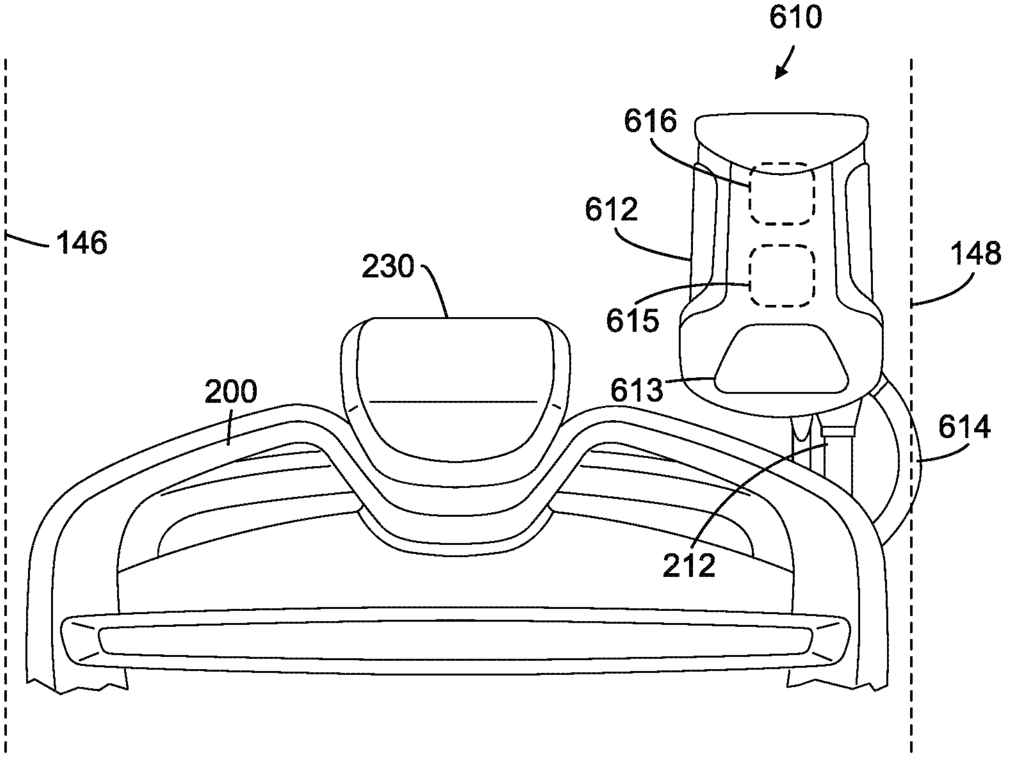
FIG. 10 shows a pneumatic system along with a partial view of a footboard of a patient support apparatus.

As used herein, the term "longitudinal" refers to a direction parallel to a central axis between a head end 144 and a foot end 142 of the patient support apparatus 100, which are defined in FIGS. 2 and 4 by visible boundary lines indicating the longitudinal limits of the patient support apparatus 100. The terms "transverse" or "lateral" refer to a direction perpendicular to the longitudinal direction and parallel to a surface on which the patient support apparatus 100 rests. The lateral limits of the patient support apparatus 100 are defined in FIGS. 3-4 as first and second sides 146, 148 (e.g., right and left sides, respectively) as the lateral limits of the patient support apparatus 100.

In FIGS. 3-4, the lateral limits correspond to the outermost sides of the patient support apparatus 100, as defined by the outermost sides of the side rails 114. Together, the head end 144, the foot end 142, the first side 146, and the second side 148 define a footprint 110 of the patient support apparatus 100. The footprint 110 may correspond to a downward footprint of the patient support apparatus 100 or an outer perimeter of the patient support apparatus 100. It is noted that the footprint 110 as defined herein may not correspond to the exact downward footprint of the patient support apparatus 100, and instead corresponds to the longitudinal and lateral limits of the patient support apparatus 100 (e.g., a rectangular footprint with length and width dimensions). With this definition of the footprint 110, by specifying the dimensions of the patient support apparatus 100, a determination can be made as to whether the patient support apparatus 100 can fit through or within a variety of spaces, such as doorways or an elevator.

It is noted that although the longitudinal limits and the lateral limits that define the footprint 110 of the patient support apparatus 100 are described in conjunction with the side rails 114, the headboard 150, and the footboard 200, the present disclosure is not so limited. The lateral and longitudinal limits may be defined by any aspect of the patient support apparatus 100.

In one aspect, the footprint 110 may be defined by one or more portions of the patient support apparatus 100 that affect the lateral and longitudinal limits of the patient support apparatus 100. For instance, lateral facing surfaces of the side rails 114 may define the footprint 110 of the patient support apparatus 100. As another example, a foot end 142 of the patient support apparatus 100 may be defined by a non-patient facing surface of the footboard 200, and this non-patient facing surface may also define the footprint 110 of the patient support apparatus 100 in conjunction with an opposite end. The non-patient facing surface may be opposite a patient facing surface of the footboard 200 and may be described as an outward facing surface of the footboard 200.

Referring to FIG. 1, the patient support 112 may include a top layer, sometimes referred to as a topper, of a mattress. The patient support 112 may be integrated into an underlying mattress (and hence form a part of the mattress) or be placed on the mattress. The mattress itself may include a variety of different cushioning assemblies, e.g., an assembly or assemblies formed from foam, foam in combination with bladders, foam in combination with one or more gel layers, or foam in combination with bladders and one or more gel layers, and may include a control system incorporated into the patient support apparatus 100 or underlying cushioning components and contained, for example, proximal to the foot end 142 of the patient support apparatus 100 in a control housing, such as disclosed in U.S. Pat. Nos. 5,542,136; 5,325,551; 7,406,736; 8,910,334 (STR03A-P239A); U.S. Pat. No. 8,911,387 (STR03A-P257A); U.S. Pat. No. 9,468,307 (STR03A P400A); and U.S. Pat. No. 9,820,904 (STR03A-P376A), which are commonly owned by Stryker Corporation of Kalamazoo, Michigan, and are incorporated by reference in their entireties herein.

Another example bladder cushioning assembly as well as a pneumatic control system is disclosed in commonly assigned U.S. patent application Ser. No. 61/696,819, which is the provisional application to U.S. Non-Provisional application Ser. No. 13/836,813 (STR03A P400A), now U.S. Pat. No. 9,468,307, and 61/697,010, which is the provisional application to U.S. Non-Provisional application Ser. No. 14/019,353 (P-405E), now U.S. Pat. No. 9,420,895, entitled INFLATABLE MATTRESS AND CONTROL METHODS and PATIENT SUPPORT, respectively, both of which were filed on Sep. 5, 2012, which are hereby incorporated herein by reference in their entireties. Yet another example bladder cushioning assembly and pneumatic control system is disclosed in U.S. patent application Ser. No. 63/359,277 (P-A 676), entitled PATIENT SUPPORT APPARATUS WITH PATIENT SUPPORT SURFACES THEREFORE, filed Jul. 8, 2022.

The patient support 112, in one aspect, may include a low air loss system operable to receive air from a pneumatic system 210. For example, the low air loss system may include perforated tubing positioned between some of the bladders or other portions of the patient support 112 so as to direct air flow across or between the bladders or the other portions, which air flow would facilitate the removal of moisture from the patient's skin. Further, tubing or tube extensions or perforated bladders may be provided to extend up between the support bladders to direct air close to the support surface. Alternately, air loss conduits may be formed in the bladder layer, for example, the base sheet between the support bladders. In one aspect, the low air loss system may be incorporated into a cover for the patient support 112, where the cover receives air from the pneumatic system 210 to remove moisture from the patient resting on the patient support 112. Such a cover may include a moisture permeable layer and a spacer material that supports an air space in the cover under the patient's weight to facilitate removal of moisture from the patient via directing air through the air space.

Additional to or alternative to the patient support 112 including bladders and/or a low-air-loss system that provides cushioning for the patient support 112, one or more turning bladders on each side of the patient support 112 may be inflated to provide patient turning capabilities (e.g., turn therapy). Turn bladders may be located under bladders and/or other cushioning aspects of the patient support 112 and may be inflated by the pneumatic system 210. In use, the turning bladders may be used for turning one side of the patient support 112 while the other remains generally stationary—though it should be understood that the bladders on the stationary side may have their pressure reduced to reduce their inflation to allow the person to immerse deeper into the surface while being turned to reduce the chances of a patient fall during turning. The turning bladders may be full length bladders that may extend substantially the full length of the patient support 112 or may be segmented. Further, the segment turning bladders may be independently inflated or deflated to allow access to a portion of a patient's body while being turned, or to effect a rolling turning effect, or just to turn a portion of the patient's body. For examples of optional controls for and examples of suitable turning bladders, reference is made to U.S. application Ser. No. 12/234,818, filed Sep. 22, 2008, now U.S. Pat. No. 8,296,887, entitled RESILIENT MATERIAL/AIR BLADDER SYSTEM; and U.S. application Ser. No. 11/891,451, filed Aug. 10, 2007, entitled TURN-ASSIST WITH ACCESS AREAS, which are incorporated herein by reference in their entireties.

As described herein, the patient support apparatus 100 may include a pneumatic system 210, which may include one or more of the following: a pump assembly 212, tubing 214, a user interface 213, and a controller 215. The pneumatic system 210 may be operably coupled to the one or more fluid receiving portions or elements of the patient support 112, such as one or more bladders (e.g., support bladders or turning bladders) or a low air loss system as described herein. The pneumatic system 210 may be operable to supply fluid to the fluid receiving portions of the patient support 112, or to receive fluid from the fluid receiving portions of the patient support 112, or both.

In one aspect, the pump assembly 212 may be integral to the patient support apparatus 100. However, the present disclosure is not so limited—the pump assembly 212 may be separate from the patient support apparatus 100.

The pneumatic system 210, or portions thereof, may be removable with respect to the patient support apparatus 100. For instance, in cases where the patient support apparatus 100 includes turning bladders or a low air loss system that is present but not active, a pump 216 provided by the pneumatic system 210 does not need to be present for the patient support apparatus 100 and may be disconnected and removed from the patient support apparatus 100.

In one aspect, the pneumatic system 210 may include a pump assembly 212 with a pump housing that contains and supports a pump 216. The pump assembly 212 of the pneumatic system 210 may be removably connected to the patient support apparatus 100, such that the pump assembly 212 and the pump 216 can be absent from the patient support apparatus 100. This way, pumps 216 can be distributed to patient support apparatuses 100 that are scheduled to use the pump 216 rather than having multiple pumps 216 not in use.

The pneumatic system 210 may be operable to control inflation pressure of the one or more fluid receiving portions of the patient support 112. For instance, the pneumatic system 210 may include a control system with a controller 215 configured to direct the pneumatic system 210 to control the inflation pressure of the one or more fluid receiving portions of the patient support 112. The controller 215 may be electrically coupled to a user interface 213 operable to receive input from a user with respect to one or more operational characteristics of the pneumatic system 210. As an example, the user interface 213 may receive and provide the controller 215 a directive to supply fluid to a bladder, such as a turning bladder, of the patient support 112 in order to increase a pressure thereof.

The user interface 213 and the controller 215 are shown in FIGS. 1-6 as being part of the pump assembly 212 of the pneumatic system 210. It is to be understood, however, that the user interface 213 or the controller 215, or both, may be separate from a pump assembly 212 of the pneumatic system 210. For instance, the user interface 213 or the controller 215, or both, may be provided in a control interface 230 coupled to the footboard 200. The user interface 213 of the pneumatic system 210 in FIGS. 1-6 is electrically connected to the controller 215; however, the user interface 213 and the controller 215 may be separate from each other. As an example, the user interface 213 or the controller 215, or both, may be provided in a component separate from the pump assembly 212.

The pneumatic system 210 may receive power and control the pump 216 in a variety of ways. Power, for instance, may be received via a power cable routed along with the tubing 214. The power cable may optionally include conductors for control signals, including communication signals and/or discrete signals. In one example, the pneumatic system 210 may be powered and controlled via a connector port (e.g., a mattress connector port) and user interface disposed on the patient support apparatus 100. As another example, the pneumatic system 210 may be plugged into an auxiliary AC outlet proximal to the foot end 142 of the patient support apparatus 100 in order to receive power, and the controller 215, as described herein, may include a user interface at the pump assembly 212.

The pump assembly 212, in some aspects, is described as part of the patent support apparatus 100. However, but it is to be understood that the pump assembly 212 may be separate and operable independent of the patient support apparatus 100.

The controller 215 may be communicatively coupled to aspects of the pneumatic system 210, such as the pump 216 provided in the pump assembly 212, a user interface, or the control interface 230. Such communication may vary depending on the application, and may include wired communications or wireless communications, or both.

The control system, including the controller 215, includes any and all electrical circuitry and components to carry out the functions and algorithms described herein. Generally speaking, the control system, including the controller 215, may include one or more microcontrollers, microprocessors, and/or other programmable electronics that are programmed to carry out the functions described herein. The control system may additionally or alternatively include other electronic components that are programmed to carry out the functions 14 described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the patient support apparatus 100, or they may reside in a common location within the patient support apparatus 100. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), and RF (cellular, WiFi, Bluetooth, Bluetooth Low Energy, Ultrawide Band).

The controller 215 may direct operation of the pneumatic system 210 based on sensor information received from one or more sensors disposed on the patient support apparatus 100. Such sensors may include, but are not limited to, one or more depth sensors, fluid pressure sensors, temperature sensors, patient interface pressure sensors, and/or humidity sensors.

The pneumatic system 210, in one aspect, may tubing 214 that may be removably coupled to the patient support 112, via a removable coupling, in order to fluidly communicate with one or more fluid receiving portions of the patient support 112, such as a turning bladder or other type of inflatable bladder. The tubing 214 may be operable to allow air (i.e., a type of fluid) to flow into and out of the patient support 112 via the removable coupling with the patient support 112. The tubing 214 may be connected to the pump 216 via a tubing connection provided on the pump housing of the pump assembly 212.

In one aspect, the pump 216 disposed within the pump assembly 212, and operation of the pump 216 may be directed by the controller 215 (e.g., a pneumatic controller). For instance, the controller 215 may direct operation of the pump 216 to supply air to the patient support 112 via the tubing 214 in order to increase the inflation pressure of a bladder of the patient support 112. The pump 216 may be a pump or blower designated for the patient support apparatus 100. The tubing 214 of the pneumatic system 210 may be fluidly coupled to the pump via the pump housing.

The pneumatic system 210 in FIGS. 1-6 is shown and described in conjunction with tubing 214. The pneumatic system 210 may also include a power cable attached to the tubing 214, such that the power cable is routed in a manner similar to the tubing 214 depicted in the figures.

In one aspect, the pump assembly 212 of the pneumatic system 210, including the pump 216, may be disposed substantially within the footprint 110 of the patient support apparatus 100. In other words, the pump assembly 212 may be positioned substantially within the lateral and longitudinal limits of the patient support apparatus 100. It is noted that, for purposes of disclosure, the pump assembly 212 of the pneumatic system 210 may be excluded from the defined lateral and longitudinal limits of the patient support apparatus 100—this way, the position of the pump assembly 212 may be independent of the footprint 110 of the patient support apparatus 100. It is further noted that with the pump assembly 212 being substantially within the footprint 110 of the patient support apparatus 100, the pump 216 within the pump housing is therefore substantially within the footprint 110. The pump 216 may be disposed anywhere within the pump housing of the pump assembly 212 in order to facilitate packaging and operation thereof.

The pump assembly 212 in FIGS. 2 and 3 is depicted entirely within the lateral and longitudinal limits of the patient support apparatus 100, as defined by the head end 144, the foot end 142, the first side 146, and the second side 148. As a result, the pump assembly 212 in FIGS. 2 and 3 is entirely within the footprint 110 of the patient support apparatus 100. However, it is noted that in one or more alternative aspects, the pump assembly 212 may fall at least partially outside the footprint 110 while being substantially within the footprint 110. For instance, a majority of the pump assembly 212 may be positioned within the footprint 110. As another example, more than 80% of the volume of the pump assembly 212 may be within the footprint 110. In yet further examples, more than 90% or more than 95% of the volume of the pump assembly 212 may be within the footprint 110.

In one aspect, with the pump assembly 212 being substantially within a footprint 110 of the patient support apparatus 100, the pump assembly 212 of the pneumatic system 210 does not substantially change a profile of the patient support apparatus 100. As a result, a caregiver can move the patient support apparatus 100 around in the same manner and within the same space limitations regardless of presence of the pump assembly 212 (including the pump 216). Additionally, the pneumatic system 210 configured in this manner may enable the patient support apparatus 100 to fit within a smaller hospital room and make it so that the patient support apparatus 100 can fit within elevators sized only for the patient support apparatus 100 without a pneumatic system or pump assembly that substantially affects a footprint 110 of the patient support apparatus 100 by its addition to thereto.

In one aspect, the pump assembly 212 may be mounted above one of the corners of the patient support apparatus 100 proximal to the footboard 200 or the foot end 142. The pump assembly 212, including the pump 216, may be an external pump assembly that is mounted to the top of the footboard 200, mounted to a post which is inserted into a traction post (e.g., a receiver 116A) proximal to the foot end 142 of the patient support apparatus 100, or both. Mounting the pump assembly 212 to a traction post may allow the pump 216 to be moved among multiple beds, including beds made by different manufacturers and for retrofitting older beds.

The routing of the tubing 214 and power cabling in FIGS. 1-6 is provided substantially within the footprint 110 of the patient support apparatus 100. Optionally, the routing of the tubing 214 and power cabling may avoid obstructing a path of the side rails 114 as they rotate from a raised position to a lowered position. For instance, the side rail 114 proximal to the footboard 200 may extend beyond the foot end 142 as the side rail 114 is rotated to the lowered position. The routing of the tubing 214 and power cabling may avoid obstructing this range of motion of the side rail 114. If the pump assembly 212 were alternatively disposed on the footboard 200 on a non-patient facing side of the footboard 200, the routing of the tubing 214 and the power cabling may need to traverse around the footboard 200 to the patient support 112, potentially obstructing the motion path of the side rail 114 proximal to the footboard 200 as it rotates toward the lowered position. By disposing the pump assembly 212 within the footprint 110 of the patient support apparatus 100, the routing of the tubing 214 and the power cabling can avoid such an obstruction with respect to the side rail 114 or movement of other components of the patient support apparatus 100.

The patient support apparatus 100 may include a receiver 116A configured to receive a pump support 218. The receiver 116A may correspond to a socket provided in the frame 120 of the patient support apparatus 100. The receiver 116A may be an existing aspect of the patient support apparatus 100, such as a traction post receiver proximal to a foot end 142 of the patient support apparatus 100. The receiver 116A is described in conjunction with being a socket in the frame 120, however, the receiver 116A may be provided at any location on the patient support apparatus 100, including a barrier of the patient support apparatus 100. In one aspect, the receiver may be absent, and the pump support 218 may form part of the patient support apparatus 100. For instance, the pump support 218 may be permanently attached to a portion of the frame 120 of the patient support apparatus 100.

The patient support apparatus 100 may include a second receiver 116B, configured similar to the receiver 116A, and disposed in a similar location to the receiver 116A with the exception of being on a side opposite the receiver 116A. The pump support 218 may be received by either the receiver 116A or the second receiver 116B.

The receiver 116A may be configured to receive and support the pump support 218 in a substantially vertical position. For instance, the pump support 218 may correspond to a post or pole that can be inserted into the receiver 116A and held in a substantially upright position with respect to the patient support apparatus 100. The pump support 218 may include first and second ends, where the first end is inserted or received by the receiver 116A.

In one aspect, the pump assembly 212 is mechanically coupled to the pump support 218 proximal to a second end of the pump support 218 and opposite the first end that is received by the receiver 116A. After the pump support 218 is disposed within the receiver 116A, and the pump assembly 212 is supported proximal to the second end of the pump support 218, the pump assembly 212 including the pump 216 is positioned above the patient support surface 118 (e.g., a patient support surface of a mattress) and above the deck surface 132 of the deck 130. The distance between the pump assembly 212 and the patient support surface 118 and/or the deck surface 132 may vary depending on the application. Generally, this distance may position the pump assembly 212 outside an area likely to be occupied by a patient. An example distance between the deck surface 132 and the pump assembly is 18 inches—although the distance may increase or decrease depending on the application.

It is noted that the overall shape and positioning of the housing of the pump assembly 212 may vary depending on the application. Alternative shapes and positioning with respect to the housing of a pump assembly are depicted in FIGS. 7-10. The pneumatic systems in FIGS. 7-10 are designated 310, 410, 510, and 610 and are similar in many respects to the pneumatic system 210 described herein. For instance, the pneumatic systems 310, 410, 510, 610 respectively include a pump assembly 312, 412, 512, 612, a pump 316, 416, 516, 616, a controller 315, 415, 515, 615, a user interface 313, 413, 513, 613, and tubing 314, 414, 514, 614. The pump assembly 312, 412, 512, 612, the pump 316, 416,

516, 616, the controller 315, 415, 515, 615, the user interface 313, 413, 513, 613, and the tubing 314, 414, 514, 614 maybe similar to the pump assembly 212, the pump 216, the controller 215, the user interface 213, and the tubing 214 described herein, with the exception of the shape, size, and position of the pump housing of the pump assembly 312, 412, 512, 612 each being different from each other and the pump assembly 212. The examples depicted in FIGS. 7-10 with respect to the various shapes, sizes, and positions of the pump housing of the pump assembly 312, 412, 512, 612 are substantially within the footprint 110 of the patient support apparatus 100, and can be seen between the first and second sides 146, 148 that define the lateral limits of the patient support apparatus 100 and at least part of the footprint 110.

Figure 11:
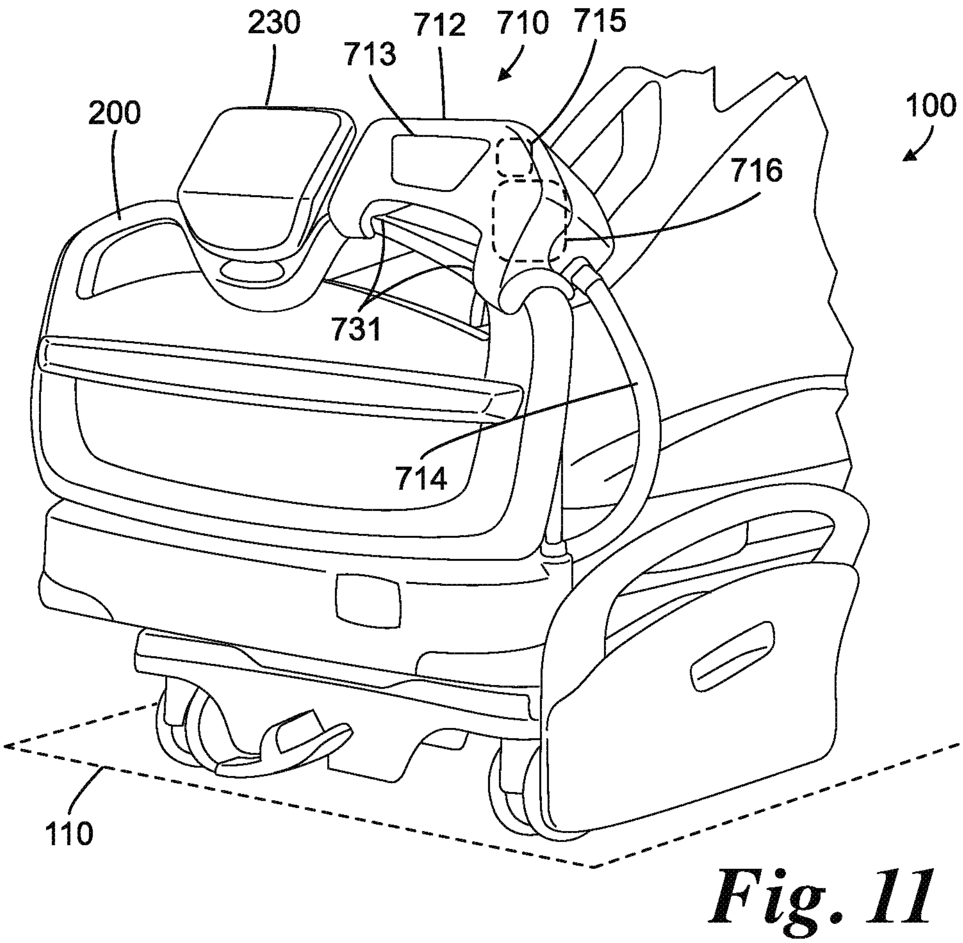
FIG. 11 shows a perspective view of a patient support apparatus along with a pneumatic system.

The patient support apparatus 100 is depicted in FIG. 11 with an alternative configuration of a pneumatic system 710 that is similar to the pneumatic system 210 but with several exceptions. For instance, the pneumatic system 710 may include a pump assembly 712 and tubing 714 operable to fluidly couple a pump 716 to the patient support 112. The pneumatic system 710 may include a controller 715 configured to direct operation of the pump 716 in order to control supply of fluid to and/or to control receipt of fluid from the patient support 112 via the tubing 714. The pump assembly 712 in FIG. 11 is substantially within the footprint 110 of the patient support apparatus 100. The pump assembly 712 may also include a user interface 713, similar to the user interface 213. Additionally, the pump 716, the controller 715, and the tubing 714 may be similar respectively to the pump 216, the controller 215, and the tubing 214.

The pump assembly 712 of the pneumatic system 710 is supported in a manner different from the pump assembly 212. For instance, the pump assembly 712 may include one or more mounts 731 operable to interface with a barrier of the patient support apparatus 100, such as the footboard 200. The mounts 731 may be configured to engage an upper portion of the footboard 200 in order to support and hold the pump assembly 712 in place with respect to the footboard 200. The mounts 731 in one aspect may be flexible clips that enable a type of snap on coupling to the upper portion of the footboard 200. The mounts 731 in another aspect may form a clamp with a movable component operable to enable engagement and release of the pump assembly 712 with respect to the upper portion of the footboard 200.

The pump assembly 712 in FIG. 11, like the pump assembly 212, may fit substantially within the footprint 110 of the patient support apparatus 100. For instance, the pump assembly 712, including the pump 716 and the pump housing, may fit entirely within the footprint 110. As another example, a majority of the pump assembly 712 may fit within the footprint 110. Additional examples include greater than 80%, 90%, or 95% of the volume of the pump assembly 712 fitting within the footprint 110 of the patient support apparatus 100.

Figure 12:
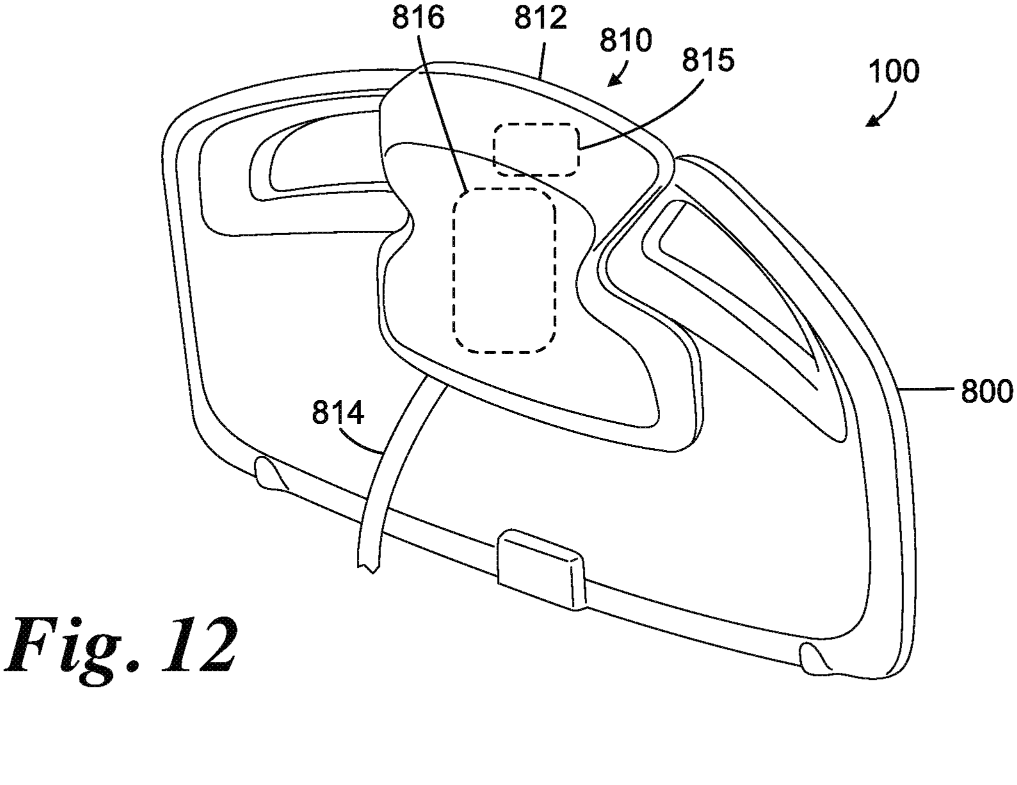
FIG. 12 shows a partial view of a patient support apparatus along with a pneumatic system.

The patient support apparatus 100 is depicted in FIG. 12 with an alternative configuration of a pneumatic system 810 that is similar to the pneumatic system 210 but with several exceptions. For instance, the pneumatic system 810 may include a pump assembly 812 and tubing 814 operable to fluidly couple a pump 816 within the pump assembly 812 to the patient support 112. The pneumatic system 810 may include a controller 815 configured to direct operation of the pump 816 in order to supply fluid to and/or receive fluid from the patient support 112 via the tubing 814. The pump 816, the controller 815, and the tubing 814 may be similar respectively to the pump 216, the controller 215, and the tubing 214. The pneumatic system 810 in FIG. 12 is depicted without a user interface—however, it is to be understood that the pneumatic system 810 may include a user interface, similar to the user interface 213.

The pump assembly 812 in FIG. 12 is substantially within the footprint 110 of the patient support apparatus 100. In FIG. 12, the pump assembly 812, including the pump 816, is disposed on a patient facing side of the footboard 800. The footboard 800 may be similar to the footboard 200 described herein, with the exception of being configured to interface with and hold the pump assembly 812 of the pneumatic system 810.

The pump assembly 812 may interface with the footboard 800 in a variety of ways, depending on the application. An example configuration includes the pump assembly 812 being an integral component of the footboard 800, such that the housing of the footboard 800 defines at least a portion of the pump assembly 812. Another example configuration includes the pump assembly 812 and the footboard 800 including one or more slide mounts adapted to enable removable engagement of the pump assembly 812 with respect to the footboard 800. The slide mounts may be arranged vertically so that engagement of the slide mounts via the pump assembly 812 can be maintained under the force of gravity.

A variety of configurations are described herein with respect to a pneumatic system that fits substantially within a footprint 110 of a patient's support apparatus. It is to be understood, however, that the present disclosure is not limited to any specific configuration or position or shape of the pump assembly of the pneumatic system. Additional examples of configurations include the pump assembly, including the pump, being disposed underneath the deck 130 of the patient support apparatus 100 (e.g., under the foot end of the bed), or another location within the frame 120.

Directional terms, such as “vertical,” “horizontal,” “top,” “bottom,” “upper,” “lower,” “inner,” “inwardly,” “outer” and “outwardly,” are used to assist in describing embodiments and aspects of the present disclosure based on the orientation of the embodiments and aspects shown in the illustrations. The use of directional terms should not be interpreted to limit embodiments or aspects to any specific orientation(s).

The above description is that of current embodiments and aspects of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments or aspects of the disclosure or to limit the scope of the claims to the specific elements illustrated or described in connection with these embodiments or aspects. For example, and without limitation, any individual element (s) of the described embodiments or aspects may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments and aspects include a plurality of features that are described in concert and that might cooperatively provide a collection of benefits. The present disclosure is not limited to only those embodiments or aspects that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

While several forms have been shown and described, other changes and modifications will be appreciated by those skilled in the relevant art. Therefore, it will be understood that the embodiments shown in the drawings and described above are merely for illustrative purposes, and are not intended to limit the scope of the disclosure which is defined by the claims which follow as interpreted under the principles of patent law including the doctrine of equivalents.

The embodiments of the invention in which an exclusive property or privilege is claimed are defined as follows:

1. A patient support apparatus including an overall length and width that define a footprint of the patient support apparatus, the patient support apparatus comprising:

a frame including a deck surface that supports a mattress;

a barrier mounted to the frame;

a pneumatic system;

a fluid receiving element in fluid communication with the pneumatic system; and the pneumatic system including a pump operable to supply fluid to the fluid receiving element via a tube, the pump disposed in a raised position relative to the deck surface such that the pump is spaced away from the deck surface of the frame and the mattress, the pump being disposed substantially inside the footprint of the patient support apparatus.

2. The patient support apparatus of claim 1 comprising a pump assembly including the pump and a pump housing that supports the pump, the pump assembly including a user interface for facilitating control over operation of the pump.

3. The patient support apparatus of claim 1 comprising a pump assembly including the pump and a pump housing that supports the pump, and wherein the pump housing is substantially within the footprint of the patient support apparatus.

4. The patient support apparatus of claim 1 comprising a receiver operable to receive and maintain a pump support in a substantially vertical position, the pump support including first and second ends, wherein the receiver is operable to receive a first end of the pump support; and wherein the pump is supported by the pump support proximal to the second end thereof.

5. The patient support apparatus of claim 4 wherein the pump support is a pole.

6. The patient support apparatus of claim 4 wherein the barrier includes the receiver.

7. The patient support apparatus of claim 4 wherein the frame includes the receiver.

8. The patient support apparatus of claim 4 comprising a pump housing for the pump, wherein the pump housing is coupled to the pump support.

9. The patient support apparatus of claim 8 wherein the pump housing is removably coupled to the pump support.

10. The patient support apparatus of claim 1 comprising a side rail mounted relative to the frame, the side rail defining at least a portion of the footprint of the patient support apparatus, and wherein the pump is disposed inside the footprint of the patient support apparatus as defined at least by the side rail.

11. The patient support apparatus of claim 1 wherein the pump is coupled to the barrier.

12. The patient support apparatus of claim 1 wherein the pump is removably disposed on a patient facing surface of the barrier.

13. The patient support apparatus of claim 1 wherein the fluid receiving element includes a bladder, and wherein the pneumatic system is configured to inflate and deflate the bladder.

14. A pump assembly for a patient support apparatus, the patient support apparatus including an overall length and width that define a footprint of the patient support apparatus, the patient support apparatus including a frame with a deck surface that supports a mattress, the patient support apparatus including a barrier mounted to the frame, the pump assembly comprising:

a pump operable to supply fluid to a fluid receiving element via a tube; and a pump housing configured to support the pump, the pump housing being disposable in a raised position relative to the deck surface such that the pump is spaced away from the deck surface of the frame and the mattress, wherein the pump housing is disposable substantially inside the footprint of the patient support apparatus.

15. The pump assembly of claim 14 comprising a user interface for facilitating control over operation of the pump.

16. The pump assembly of claim 14 wherein the pump assembly is configured to attach to and be supported by a pump support, wherein the pump support includes first and second ends.

17. The pump assembly of claim 16 wherein a receiver of the patient support apparatus is operable to receive a first end of the pump support, and wherein the pump is supported by the pump support proximal to the second end thereof.

18. The pump assembly of claim 17 wherein the pump support is a pole.

19. The pump assembly of claim 17 wherein the barrier includes the receiver.

20. The pump assembly of claim 1 wherein the fluid receiving element includes a bladder, the pump assembly is configured to inflate and deflate the bladder.

* * * * *